US006954142B2

(12) United States Patent
Lieberman et al.

(10) Patent No.: US 6,954,142 B2
(45) Date of Patent: Oct. 11, 2005

(54) SURVEILLANCE SYSTEM AND METHOD

(75) Inventors: Robert A. Lieberman, 1309 Florwood Ave., Torrance, CA (US) 90503; Thomas C. Forrester, 901 S. 6th Ave., Apartment 61, Hacienda Heights, CA (US) 91745

(73) Assignees: Robert A. Lieberman, Torrance, CA (US); Thomas C. Forrester ( * ) Notice: Subject to any disclaimer, the term of this patent is extended or adjusted under 35 U.S.C. 154(b) by 127 days.

(21) Appl. No.: 10/002,759

(22) Filed: Oct. 31, 2001

(65) Prior Publication Data

US 2002/0050931 A1 May 2, 2002

Related U.S. Application Data

(60) Provisional application No. 60/244,677, filed on Oct. 31, 2000.

(51) Int. Cl.7 ............................. G08B 29/00; G08B 1/08
(52) U.S. Cl. ....................... 340/509; 340/511; 340/517; 340/521; 340/539.17; 340/539.22
(58) Field of Search ................................. 340/509, 511, 340/517, 521, 539.22, 539.26, 539.28, 539.17, 539.13

(56) References Cited

U.S. PATENT DOCUMENTS

| 4,117,405 | A | * | 9/1978 | Martinez ..................... 455/502 |
| 4,857,912 | A | * | 8/1989 | Everett, Jr. et al. ......... 340/508 |
| 5,132,968 | A | * | 7/1992 | Cephus ........................ 340/539 |
| 5,381,136 | A | * | 1/1995 | Powers et al. .............. 340/539 |
| 6,421,571 | B1 | * | 7/2002 | Spriggs et al. ................ 700/17 |
| 6,442,639 | B1 | * | 8/2002 | McElhattan et al. ........ 710/303 |

* cited by examiner

Primary Examiner—Donnie L. Crosland
(74) Attorney, Agent, or Firm—Lawrence S. Cohen

(57) ABSTRACT

A sensor system in which a sensor suite has a locally located field sensing unit (FSU) that converts and evaluates sensor information using sensor fusion algorithms and is thereby able to send qualitative low-bandwidth, low power usage signals to a remote command post.

9 Claims, 3 Drawing Sheets

SURVEILLANCE SYSTEM AND METHOD

REFERENCE TO RELATED APPLICATIONS

This reference is to provisional application Ser. No. 60/244,677 filed on Oct. 31, 2000 the content of which is incorporated by reference herein.

The invention was made with Government support under contract numbers NASA1-19895 and NASA1-20206.

This invention was made with government support under grant USAF F41624-95-C-1013 awarded by the United States Air Force (USAF). The government has certain rights to the invention.

FIELD OF THE INVENTION

The present invention relates to the field of surveillance and monitoring equipment and methods.

BACKGROUND

With conventional remote sensor systems, raw data must be forwarded continuously to central command posts for evaluation over high-bandwidth communication channels, which are easy to detect, intercept, and jam.

DETAILED DESCRIPTION

Figure 1:
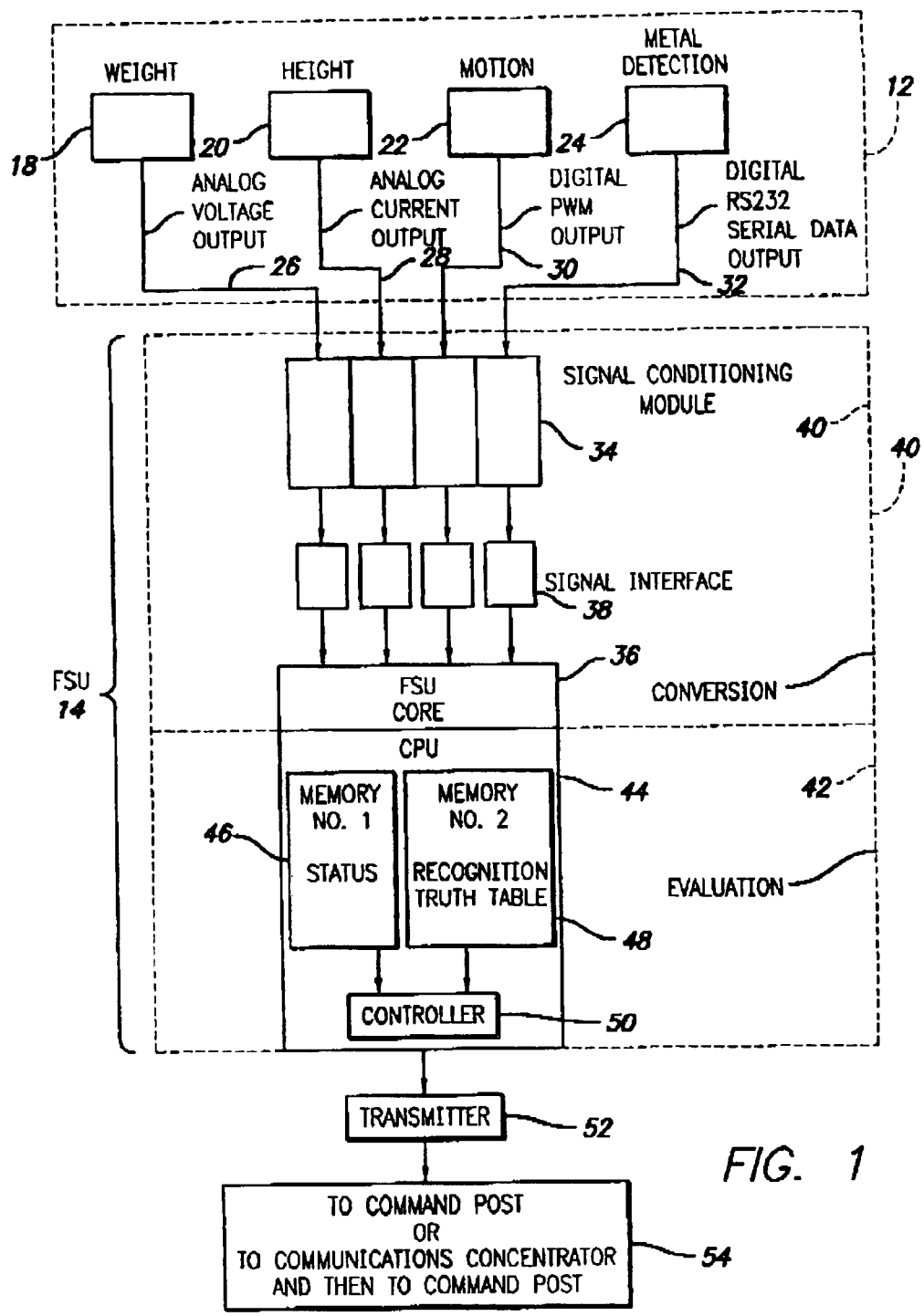
FIG. 1 shows schematically an exemplary embodiment of the invention.
Figure 1A:
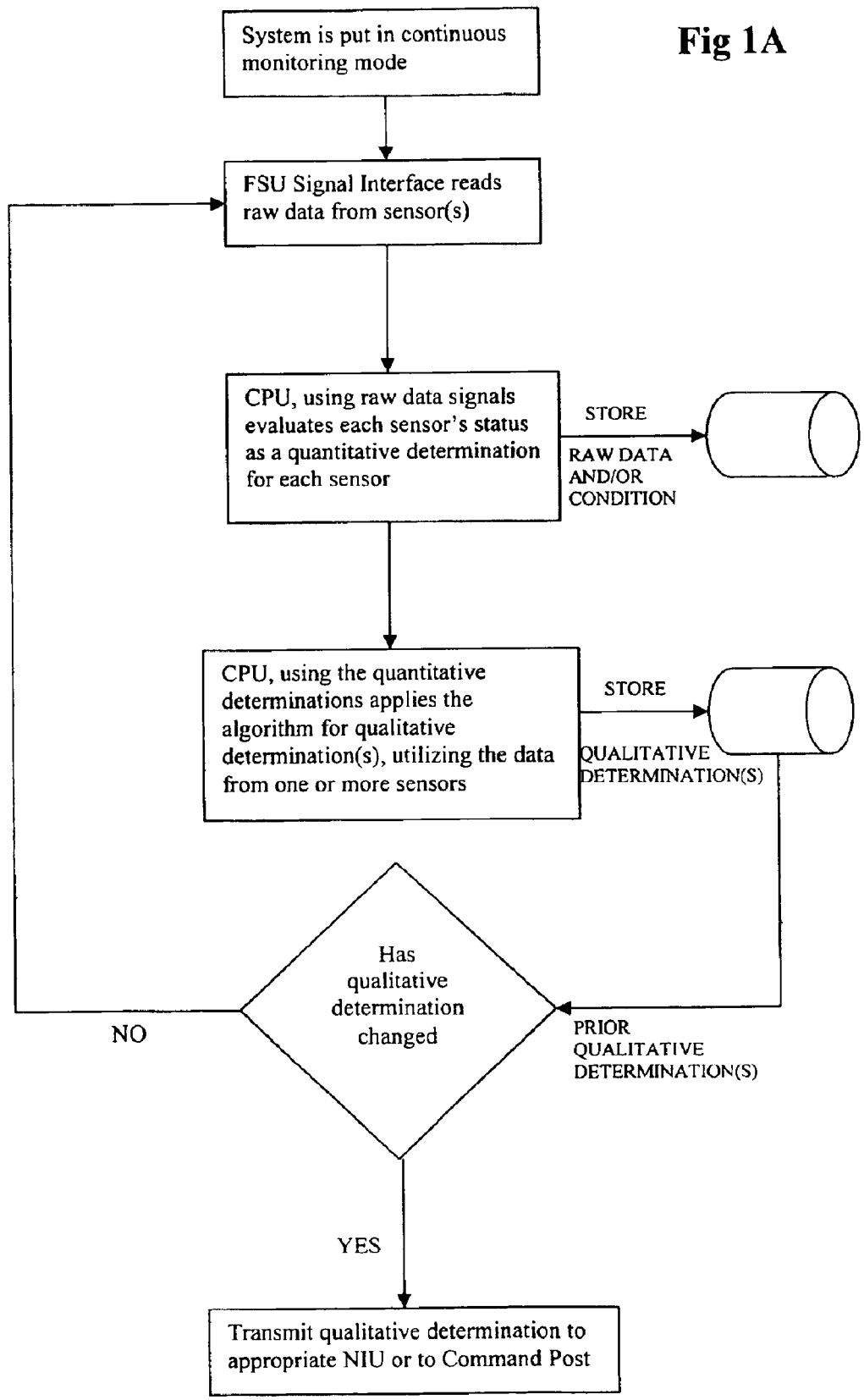
FIG. 1A shows a flow chart of an exemplary embodiment of the invention in which sensor status as a quantitative determination is/are used to obtain qualitative determination(s).

As explained below, the invention in its broadest sense is in providing a field sensing unit (FSU) co-located with a sensor suite to process incoming sensor information and to send to relatively distant command post qualitative information resulting from the processing by the FSU.

Information sent from the sensors to the FSU may take place through a high bandwidth transmission channel.

But communications from the FSU to an NIU or a command post is through a low power narrow bandwidth channel which is most likely to be wireless but could be hand wired.

Notwithstanding the generally open-ended choice of sensors, it is a particular aspect of this invention to define a chemical and biological agent remote detection network, using the features of the invention in combination with sensors that are wholly or at least partially selected to detect chemical and biological agents that are a threat directed by an enemy in order to enable a response to the threat. In that implementation, the system is designed to monitor remotely installed chemical and biological agent detectors (sensors), preprocess data from the sensors and forward the results, only when appropriate to do so, to a command post. This system is capable of being constructed to function with virtually any set or combination of sensors operating both in analog and digital signal modes.

Key to the system is the FSU's ability to monitor both "smart" and "dumb" sensors, and forward only status and/or condition changes to the command post. The FSU is an intelligent sensor monitor with on-board computing capabilities. A single FSU can monitor the output, and in many cases, the "health", of multiple sensors simultaneously attached to it. The FSU continuously evaluates the condition of each sensor with discrete outputs, and preprocesses data from sensors, which cannot evaluate their own data (such as a simple temperature sensor). In a preferred embodiment, only status changes are transmitted from the FSU to the command post. This provides for extremely low bandwidth communications, which have a low probability of interception (LPI) as well as low probability of detection (LPD), making the system's communications to the command post almost impossible to intercept, and the FSUs nearly impossible to locate. This "stealth" sensing capability is of great importance to all military, government, and civilian applications of remote sensing.

In an implementation, at the command post, a network interface unit (NIU) receives data from multiple FSUs and forwards the data to a PC command post console for display to operators. Connections from FSU to NIU can be achieved via metallic cabling, fiber-optic cabling or wirelessly via radio frequency (RF) transmissions or line-of-sight (LOS) free space laser communications. NIUs can also "poll" FSUs to obtain their status, as well as the status of the sensors attached to them, if desired.

The FSU is unique in that it is locally located with the sensor suite and that it can evaluate raw data from virtually any sensor and locally determine whether an "alarmed" or "threat" condition exists. Also, by having local computing capability on-board each FSU, data from "smart" sensors can be evaluated over a period of time or compressed to a single condition statement that can be transmitted instantly to the command post.

Another aspect of the invention is that sensor fusion can be accomplished by the FSU located locally with the sensor suite so that a qualitative low-bandwidth message can be sent from the sensor suite vicinity or location directly or indirectly to a command post. For example, an alarm condition might be transmitted only if two or more sensors are tripped, allowing commercial off-the-shelf (COTS) and military off-the-shelf (MOTS) sensors to work together to detect threats. If desired, raw data stored in the FSU, or live from the sensors, if desired, can be transmitted periodically or on demand to the NIU and forwarded to the command post for viewing or detailed analysis and logging.

In summary, the FSU of the present invention can provide a selected set or all of the following features:

accommodate analog and digital sensors of virtually any type;

locally re-initialize or cycle the power of its associated sensors;

make dumb sensors smart by locally processing their raw outputs;

activate and evaluate sensor unit built-in tests (BITs) or power-on self-tests (POSTs);

locally monitor sensor unit "health" or "heartbeat" outputs;

provide local test capabilities to sensors that have no on-board test/health capabilities;

provide standardized output from sensors with different interface characteristics;

fuse the data from multiple sensors to provide advanced detection capabilities;

Increase the operating time of battery powered sensors by controlling their power Sensor fusion is generally understood in the art. In this implementation at the first level of sensor fusion at an FSU, the raw data output of the sensor is the sensor's reaction to that which it senses. The sensor can amplify, and convert the sensor response to an electrical signal. In effect, a sensor is a transducer that converts one form of energy to another or a measurable event to an observable form.

The FSU discerns that sensor output, that is it analyses the raw data output and makes conditional assessment of the environment being sensed by a group of sensors, the sensor suite.

FIG. 1 shows schematically an exemplary embodiment of the sensor system 10 having a sensor suite 12 and a field sensing unit 14. Signals from the FSU 14 are sent either to the command post 16 or to a network interface unit (NIU) which functions as a communications concentrator, and then to a command post 16.

The physical separation of the sensor suite 12 and the FSU 14 is relatively small. For example the sensor suite 12 and the FSU 14 may be installed in a single structure. Thus, when used herein, the term to describe that closeness is that the FSU 14 is locally located relative to the sensors of the sensor suite 12 in order to accomplish the operating objectives described herein. Communications from the sensors may be hard wired or low power short range wireless communications.

Referring again to FIG. 1, four sensors 18, 20, 22 and 24 have been arbitrarily defined for sensing weight (18), height (20), motion (22) and metal detection (24). It is not intended by this arbitrary selection to limit the invention to any particular choice of sensors. The particular set of sensors will be selected according to the particular challenge and requirements.

Again for exemplary purposes, the weight detector 18 has an analog voltage output signal 26, the height detector 20 has an analog current output 28, the motion detector 22 has a digital PWM output 30 and the metal detector 24 has a digital RS-232 serial data output 32.

Each of the outputs is sent to a signal conditioning module 24 that translates the output signal to a form that the FSU core 36 can interpret. After translation by the signal conditioning module 34 each signal passes through a signal interface 38 that converts the signals to a common digital format and then to the FSU core 36. The FSU core 36 could implement a common format or could be capable of interpreting multiple formats in which case the signal interface 38 is allowed to convert to any of the formats. Therefore the signal conditioning module 34, the signal interface 38 and the FSU core 36 comprise a signal conversion function 40.

Then the signals pass to the evaluation function 42, which is performed by the CPU 44. The CPU 44 is programmed to determine each sensor's status through an appropriate algorithm.

The evaluation process in the CPU 44 comprises:

1. The algorithm for each sensor makes a determination of the sensor's status, "Status" means a determination of the meaning of the raw data from the sensor. This is a quantitative determination programmed into the program memory 46 (memory no. 1) to assess the raw data. This is done for each sensor;

2. A secondary algorithm, such as a recognition algorithm makes a qualitative determination based on the determinations made in step 1. This uses the quantitative data according to a set of rules that are programmed as a multi-state multi-dimensional truth table comprising in general the final step of sensor fusion. These functions are shown as memory no. 2, 48.

Consequently the sensor fusion step occurs locally relative to the sensors, in the FSU 14 using the combined sensor data to enable decisions or control processes. Although sensor fusion can be accomplished with hardware, it is expected that software processes will be used.

Operation of the algorithm of step 2 according to the set of rules, which it implements, results in a qualititative determination of the status of the environment being sensed. The controller 50 controls the CPU operations. The results of the CPU operations are sent to the transmitter 52. That determination is transmitted via transmitter 52 to the command post 54 or to a communications concentrator if more than one sensing system is in use, and then to the command post.

Figure 2:
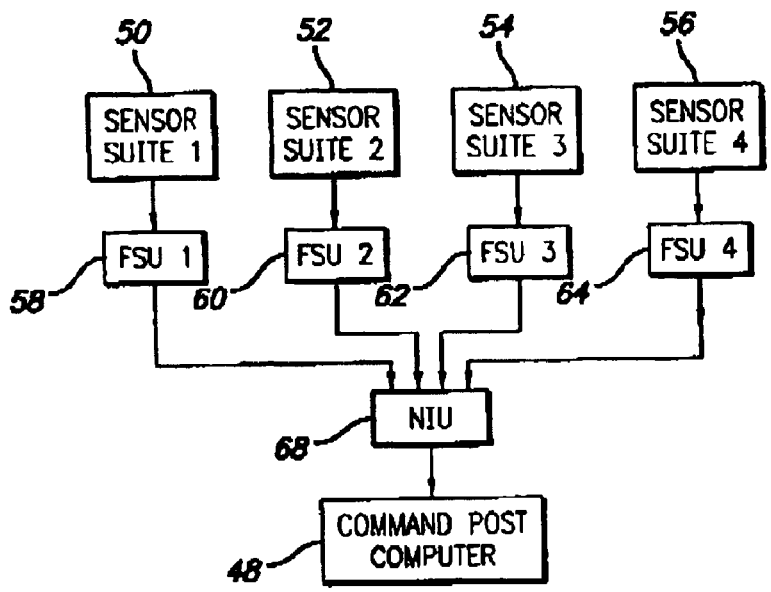
FIG. 2 shows schematically a sensor system of the invention having a plurality of sensor suites.

FIG. 2 shows schematically a sensor system as described above having a plurality of sensor suites 50, 52, 54, 56 and an FSU locally located at, 58, 60, 62 and 64 in which the FSU outputs are sent to a network interface unit (NIU) 68 which functions as a communications concentrator. In one mode of operation the NIU 68 is co-located with the command post 48.

Figure 3:
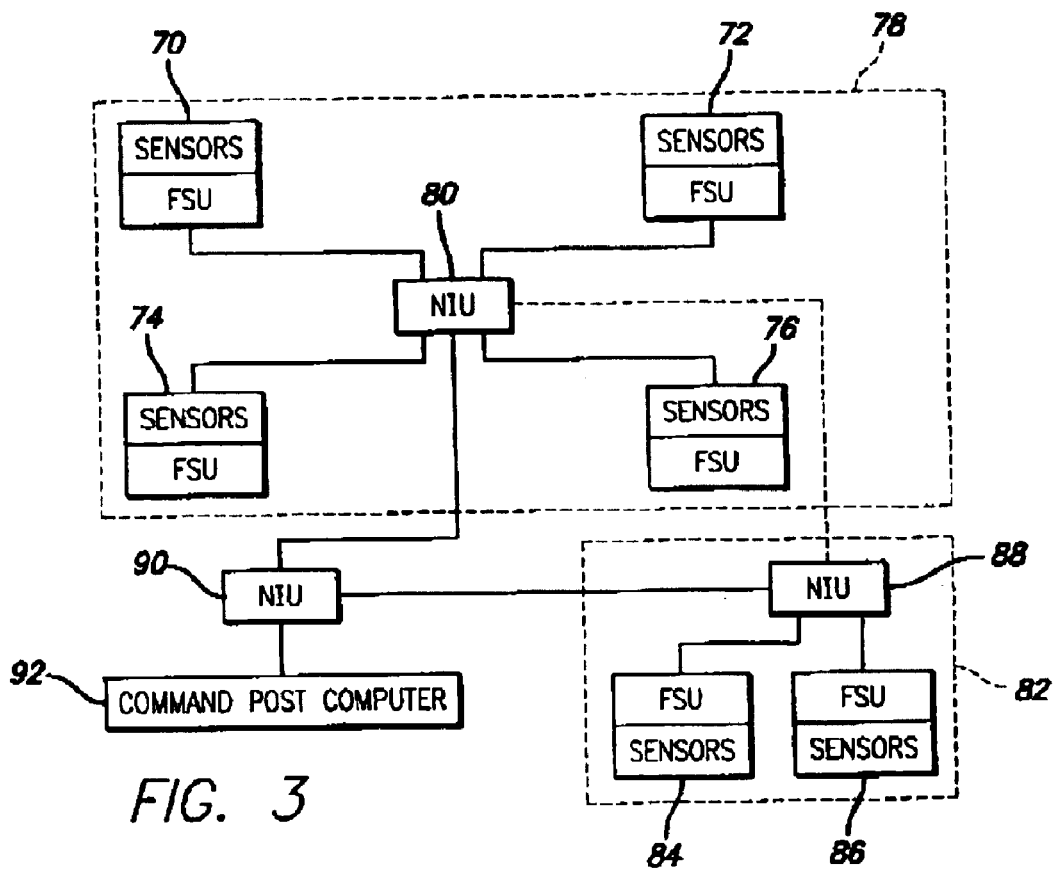
FIG. 3 shows schematically an embodiment of the invention having a more complex network of sensor suites.

FIG. 3 shows schematically a more complex network in which a set of sensor suites and their associated FSUs, 70, 72, 74 and 76 that comprise a first sensing sub-network, 78 having a first common set of sensors for each FSU communicating to a first NIU 80 and a second sensing sub-network, 82 having a second common set of sensors FSU, 84 and 86 to a second NIU 88. For example the first sub-network 78 could be for perimeter guarding, and the second sub-network 88 could be for chemical and biological agent detection. The first and second sub-networks could communicate independently to one or more separate command post receivers, or through another NIU 90 to the command post computer 92.

In all cases, the sensor fusion step takes place in the FSU evaluation module locally located with its associated sensors, the determination being transferred to the NIU at such time that a signal is determined to be appropriate by the algorithm in the FSU, or in the NIU, and then to the command post computer, or directly to the command post computer if NIUs are not used.

The system can work in either of two modes. One mode is by asynchronous transfer by the FSU during interrupt driven operation. The other mode is through queries from the command post or the NIU, that is, by polling operation.

Therefore, pursuant to the foregoing, in operation the sensor data from the sensor suite is processed in the locally located FSU and the FSU output is the condition of the environment that the sensor FSU combination has been deployed to sense, as determined by the FSU's algorithm, which is executed locally to the sensor suite.

A chemical and biological agent detection system in particular is suited to have a full sensor suite in a single structure with the FSU also in that structure.

Although the NIU can act as a communications concentrator to collect FSU determinations it can also be programmed to conduct further fusion of multiple FSU determinations.

While specific examples of the present invention have been provided, many variations of the invention will become apparent to those of skill in the art upon review of this specification. The scope of the invention should therefore be determined with reference to the appended claims along with their fall scope of equivalents.

What is claimed is:

1. A surveillance system comprising;
   a sensor suite having a plurality of sensors of the type that sense a condition of the ambient physical environment each sensor having a sensor output signal;

a field sensing unit locally located with and in communication with each sensor to receive sensor output signals;

the field sensing unit further comprising a sensor fusion module having a CPU programmed to determine the status of each sensor based on its sensor output signal and through a programmed algorithm to derive a qualitative determination from the status determinations of the sensors; and the field sensing unit further comprising a transmitter for transmitting the qualitative determination as a narrow bandwidth signal to a remote command center.

2. The surveillance system of claim 1 further wherein said sensor suite and said field sensing unit are installed in a unitary structure.

3. A system as in claim 2 wherein said field sensing unit includes assessment means for evaluating status change indications over time for determining a condition statement for transmission, apparatus including a field sensing unit for monitoring the status of said sensors, said unit including means for computing a change in status indication for each of said sensors under surveillance via sensor fusion, and said field sensing unit using sensor fusion operations based on the change in status indicators of the sensors to compute a qualitative determination of the status of the environment to determine if a defined status of the environment is present, said field sensing unit including means for transmitting said change in status indications to a command module via a narrow bandwidth signal if the defined status of the environment is present.

4. A system as in claim 1 including a plurality of remote location each of which includes a plurality of sensors, each of said remote locations including a field sensing unit, said command center including means for polling said plurality of field sensing units for initiating transmissions therefrom.

5. A system for displaying status change indications, of a plurality of smart sensors positioned at a remote location, said system including a command console for displaying said indications, said system also including a field sensing unit at said remote location, said field sensing unit including means for comparing present status indications for said smart sensors with next prior status indications for said sensors and a programmed algorithm to derive a qualitative determination therefrom, said field sensing units including means for transmitting the qualitative determination to said command console.

6. A system as in claim 5 wherein said field sensing unit includes means for determining whether or not a said change in status indication institutes an alarm condition.

7. A security apparatus including a plurality of sensors responsive to the presence of airborne chemicals and/or biological agents, said apparatus including a field sensing unit for monitoring the status of said sensors, said unit including means for computing a change in status indication for each of said sensors under surveillance via sensor fusion, and said field sensing unit using sensor fusion operations based on the change in status indicators of the sensors to compute a qualitative determination of the status of the environment to determine if a defined status of the environment is present, said field sensing unit including means for transmitting said change in status indications to a command module via a narrow bandwidth signal if the defined status of the environment is present.

8. A field sensing unit for monitoring the status of a plurality of smart sensors, said unit having a sensor fusion module being operative to compare present status indications with next prior status indications and having a programmed algorithm for computing qualitative change of status indications, said unit including means for transmitting the qualitative change of status indications via a narrow bandwidth signal.

9. A system comprising a community of individual sensor suites having sensors of the type that sense a condition of the ambient environment, a sensor fusion device, and a command sensor remote from said suites and said sensor fusion device, each of said sensor suites comprising a plurality of sensors each responsive to the presence of its specified sensing input for generating signals representative thereof, said sensor fusion device being operative through a programmed algorithm to derive a qualitative interpretation of the signals from at least one of said sensor suites and for communicating said interpretation to said remote command center via a narrow bandwidth signal.

* * * * *

UNITED STATES PATENT AND TRADEMARK OFFICE
CERTIFICATE OF CORRECTION

PATENT NO. : 6,954,142 B2
DATED : October 11, 2005
INVENTOR(S) : Robert A. Lieberman and Thomas C. Forrester It is certified that error appears in the above-identified patent and that said Letters Patent is hereby corrected as shown below:

<u>Title page,</u>
Item [73], Assignee, should read -- Optech Ventures LLC, Torrance, CA (US) --.

Signed and Sealed this

Twentieth Day of December, 2005

JON W. DUDAS
*Director of the United States Patent and Trademark Office*